(12) United States Patent
Suggs

(10) Patent No.: US 11,307,672 B2
(45) Date of Patent: Apr. 19, 2022

(54) KEYBOARD PIVOTALLY ATTACHED TO A PART COMPRISING A TOUCH-SENSITIVE SURFACE

(71) Applicant: HEWLETT-PACKARD DEVELOPMENT COMPANY, L.P., Spring, TX (US)

(72) Inventor: Bradley Neal Suggs, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 814 days.

(21) Appl. No.: 16/075,634

(22) PCT Filed: Jun. 13, 2017

(86) PCT No.: PCT/US2017/037177
§ 371 (c)(1),
(2) Date: Aug. 4, 2018

(87) PCT Pub. No.: WO2018/231198
PCT Pub. Date: Dec. 20, 2018

(65) Prior Publication Data
US 2021/0208690 A1  Jul. 8, 2021

(51) Int. Cl.
*G06F 3/02* (2006.01)
*G06F 1/16* (2006.01)
(Continued)

(52) U.S. Cl.
CPC .......... *G06F 3/0202* (2013.01); *G06F 1/1618* (2013.01); *G06F 1/1671* (2013.01);
(Continued)

(58) Field of Classification Search
None
See application file for complete search history.

(56) References Cited

U.S. PATENT DOCUMENTS 6,744,622 B2  6/2004 Lee et al.
7,136,282 B1  11/2006 Rebeske
(Continued)

FOREIGN PATENT DOCUMENTS

CN  1371567 A  9/2002
CN  102622052 A  8/2012
(Continued)

OTHER PUBLICATIONS

Hazarika, "CES 2011: NEC's dual screen Android tablet unveiled", CES 2011, Retrieved from Internet: https://www.notebookcheck.net/CES-2011-NEC-s-dual-screen-Android-tablet-unveiled.43936.0.html, Jan. 7, 2011, 2 Pages.

*Primary Examiner* — Stephen T. Reed
(74) *Attorney, Agent, or Firm* — Trop, Pruner & Hu PC

(57) ABSTRACT

In some examples, an electronic device includes a first part comprising a touch-sensitive surface, and a mechanical keyboard pivotally attached to the first part, where the mechanical keyboard is pivotable between a first position where the keyboard is away from the touch-sensitive surface, and a second position where the keyboard is engaged to the touch-sensitive surface. The touch-sensitive surface is to detect actuations of keys of the mechanical keyboard when the mechanical keyboard is at the second position and engaged with the touch-sensitive surface.

19 Claims, 5 Drawing Sheets

(51) Int. Cl.
  *G06F 3/044*     (2006.01)
  *G06F 3/04886*   (2022.01)
  *G06F 3/045*     (2006.01)

(52) U.S. Cl.
  CPC .......... *G06F 1/1681* (2013.01); *G06F 3/0227* (2013.01); *G06F 3/044* (2013.01); *G06F 3/04886* (2013.01); *G06F 3/045* (2013.01); *G06F 2203/04809* (2013.01)

(56) References Cited

U.S. PATENT DOCUMENTS

| | | | |
|---|---|---|---|
| 7,286,341 | B1 | 10/2007 | Chang et al. |
| 8,866,840 | B2 | 10/2014 | Dahl et al. |
| 9,606,664 | B2 | 3/2017 | Knepper et al. |
| 2004/0001306 | A1* | 1/2004 | Oakley ................ G06F 1/1662 361/679.1 |
| 2009/0201254 | A1 | 8/2009 | Rais |
| 2013/0335327 | A1* | 12/2013 | Solomon ............... G06F 1/1669 345/168 |
| 2013/0346636 | A1* | 12/2013 | Bathiche ............... G06F 1/1632 710/8 |

FOREIGN PATENT DOCUMENTS

| | | |
|---|---|---|
| CN | 102150096 B | 4/2014 |
| DE | 10053790 A1 | 5/2002 |
| EP | 2163967 A2 | 3/2010 |
| WO | 2018080431 A1 | 5/2018 |

\* cited by examiner

KEYBOARD PIVOTALLY ATTACHED TO A PART COMPRISING A TOUCH-SENSITIVE SURFACE

BACKGROUND

An electronic device can include a user input device for entering information or for making control selections at the electronic device. In some examples, a user input device can include a physical keyboard, which can either be an external keyboard or a keyboard that is part of the electronic device (e.g., such as a keyboard of a notebook computer). In other examples, an electronic device such as a tablet computer or a smartphone can use a virtual keyboard that is displayed by a display device of the electronic device.

BRIEF DESCRIPTION OF THE DRAWINGS

Some implementations of the present disclosure are described with respect to the following figures.

Figure 1A:
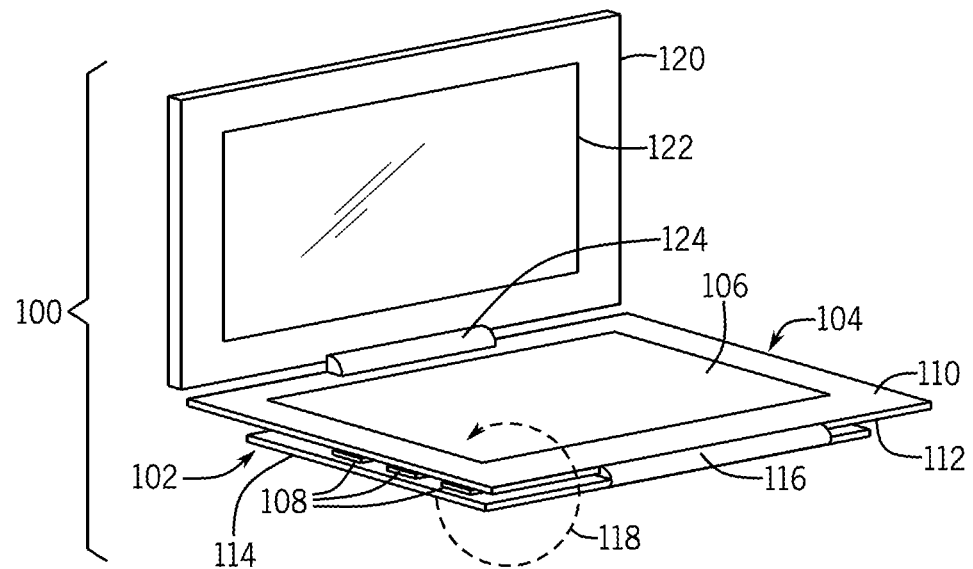
FIGS. 1A and 1B illustrate an electronic device in different modes of operation, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Electronic devices can include touch-sensitive displays. A touch-sensitive display of an electronic device can display a virtual keyboard for a user to enter information or make control selections. However, users may find the use of a virtual keyboard unsatisfactory or unwieldy. For example, when typing on a virtual keyboard, a user may not have a place to rest the user's palm without touching the touch-sensitive display and causing spurious inputs. Alternatively, a user may find that a virtual keyboard does not provide the desired tactile feedback that a physical keyboard can provide.

Figure 1B:
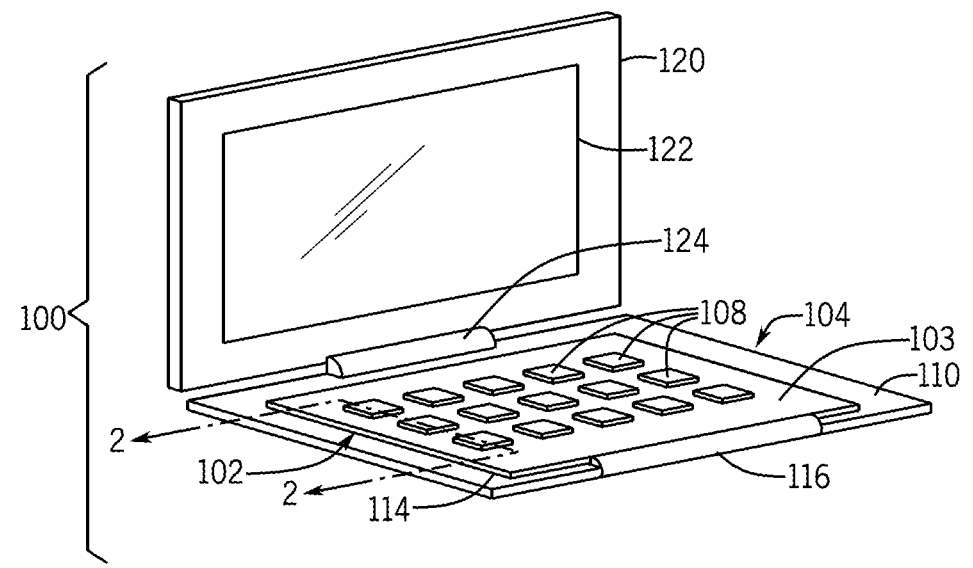

In accordance with some implementations of the present disclosure, as shown in FIGS. 1A and 1B, an electronic device 100 includes a mechanical keyboard 102. The mechanical keyboard 102 is pivotally mounted to another part (referred to as a "base part" 104) of the electronic device 100. The base part 104 has a touch-sensitive surface 106 (e.g., a touch-sensitive display or any other type of surface that is able to detect touch inputs). As used here, the term "mechanical keyboard" can refer to a physical keyboard that has tactile elements that a user's fingers can actuate mechanically. The tactile elements are in the form of keys 108 that can be pressed by a user's fingers. A mechanical keyboard differs from a virtual keyboard, where a virtual keyboard is displayed by a display device to emulate an actual keyboard.

The base part 104 has an upper surface 110 (in the orientation shown in FIG. 1A) and a lower surface 112 that is on an opposite side of the housing of the base part 104 from the upper surface 110. The touch-sensitive surface 106 is formed in the upper surface 110.

In the position shown in FIG. 1A, the mechanical keyboard 102 is positioned away from the touch-sensitive surface 106. In the position shown in FIG. 1A, the mechanical keyboard 102 is underneath the lower surface 112 of the base part 104, such that the keys 108 of the mechanical keyboard 102 face the lower surface 112 of the base part 104. The position of the mechanical keyboard 102 shown in FIG. 1A can be referred to as a "disengaged position," where the mechanical keyboard 102 is in a position where the mechanical keyboard 102 is not being used.

The position of the mechanical keyboard 102 shown in FIG. 1B can be referred to as an "engaged position." In the engaged position shown in FIG. 1B, the keys 108 of the mechanical keyboard 102 face upwardly away from the base part 104. A lower surface 114 of the mechanical keyboard 102 is engaged with the upper surface 110 of the base part 104 in the engaged position of FIG. 1B. In the engaged position, the lower surfaces of the keys 108 of the mechanical keyboard 102 are placed in proximity to the touch-sensitive surface 106, such that when the keys 108 are pressed by a user's fingers, the lower surfaces of the keys 108 can touch the touch-sensitive surface 106. As a result, in the position shown in FIG. 1B, the mechanical keyboard 102 is engaged to the touch-sensitive surface 106, since user actuation of the keys 108 of the mechanical keyboard 102 are detectable by the touch-sensitive surface 106. Stated differently, the mechanical keyboard 102 is engaged with the touch-sensitive surface 106 if the keys 108 of the mechanical keyboard 102 are close enough to the touch-sensitive surface 106 such that pressing of the keys 108 by an input object (a user's finger or other object) can be detected by the touch-sensitive surface 106.

To move the mechanical keyboard 102 from the disengaged position (FIG. 1A) to the engaged position (FIG. 1B), the mechanical keyboard 102 is rotated about a hinge 116 (along a rotational path represented by 118). Although just one hinge 116 is shown in FIGS. 1A and 1B, it is noted that in other examples, there can be multiple hinges that pivotally connect the mechanical keyboard 102 to the base part 104.

In operation, as a user types on the mechanical keyboard 102 in the engaged position, the pressing of the keys are detected at different locations of the touch-sensitive surface 106. The different keys 108 of the mechanical keyboard 102 can touch different locations of the touch-sensitive surface 106. The touches of the keys at the different locations of the touch-sensitive surface 106 can be mapped by a controller in the base part 104 (hereinafter referred to as a "base part controller") to the different keys. Thus, if the "a" key is pressed, then the "a" key touches a first location on the touch-sensitive surface 106, which is detected by the base part controller and is mapped to the letter "a." Similarly, if the "a" key is pressed, the "b" key touches a second location (different from the first location) on the touch-sensitive surface 106, which is mapped by the base part controller to the letter "b." It is noted that it is possible for combinations of keys to be actuated, such as a "shift" key and a letter key, which indicates capitalization. When a combination of keys are actuated at the same time, the combination of keys touch respective different locations on the touch-sensitive surface 106, which is mapped by the base part controller to a respective input, e.g., capital "A."

The base part controller that maps key actuations as detected by the touch-sensitive surface 106 to respective inputs can include a hardware controller or can include machine-readable instructions (e.g., software or firmware).

The mechanical keyboard 102 is an inert overlay keyboard that has actuatable keys, but that is without any electronic circuitry to detect key actuations. A typical keyboard includes electronic circuitry, including a matrix of electrically conductive lines and sensing circuitry to sense which keys are actuated. However, in accordance with some implementations of the present disclosure, by using the touch-sensitive surface 106 to detect key actuation, the electronic circuitry used in typical keyboards can be omitted. Instead, the mechanical keyboard 102 can be implemented as an overlay layer of keys provided over the touch-sensitive surface 106. The mechanical keyboard 102 can be formed of a polymer, a plastic, an aluminum or other metal, or any other material.

As further shown in FIGS. 1A-1B, the electronic device 100 includes another part 120 (referred to as a "display part") that has a display device 122. The display device 122 can display a graphical user interface (GUI) or any image selected by a user, an application, an operating system, or any other entity for display. In some examples, the display device 122 can be a touch-sensitive display device. In other examples, the display device 122 is a non-touch-sensitive display device.

The display part 120 is pivotally attached to the base part 104 by a hinge 124. Although just one hinge 124 is shown in FIGS. 1A and 1B, it is noted that in other examples, there can be multiple hinges that pivotally connect the base part 104 and the display part 120.

With the hinge 124, the display part 120 can rotate with respect to the base part 104. For example, the display part 120 can be pivoted toward the base part 104 such that the faces of the display part 120 and the base part 104 touch each other to form a clamshell.

In the orientation shown in FIG. 1B, where the mechanical keyboard 102 is in the engaged state, the electronic device 100 is operated in a physical keyboard notebook mode, where the electronic device 100 can be operated as a notebook computer and a physical keyboard is used to allow user input.

In the orientation shown in FIG. 1A, the electronic device 100 is operated in a touch notebook mode. In the touch notebook mode, user inputs can be made through the touch-sensitive surface 106 instead of using the mechanical keyboard 102. In examples where the touch-sensitive surface 106 is a touch-sensitive display, the touch-sensitive display can display a virtual keyboard to allow a user to type on the virtual keyboard.

Figure 2A:
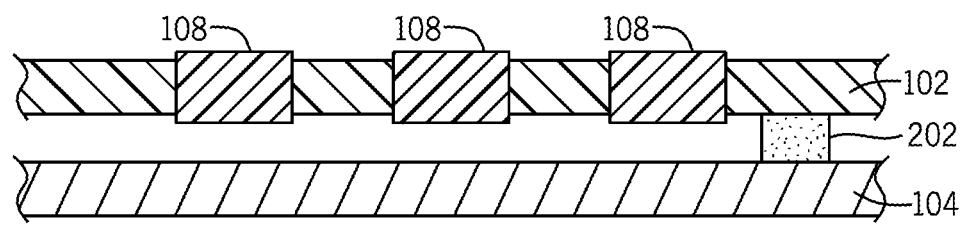
FIGS. 2A and 2B are cross-sectional views of an arrangement including a base part having a touch-sensitive surface and a mechanical keyboard, according to some examples.
Figure 2B:
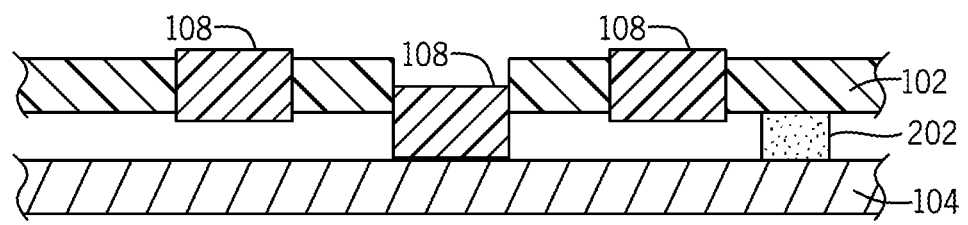

FIGS. 2A and 2B are cross-sectional views of a portion of the base part 104 and the mechanical keyboard 102 in the orientation shown in FIG. 1B, along line 2-2. As shown in FIG. 2A, the keys 108 of the physical keyboard 102 are positioned above and in close proximity to the touch-sensitive surface 106. A gap is present between the keys 108 and the touch-sensitive surface 106 when the keys 108 are not pressed downwardly. An inert standoff 202 can be part of the base part 104, to space the physical keyboard 102 away from the base part 104. Although just one standoff 202 is shown in FIGS. 2A and 2B, multiple standoffs can be provided in other examples.

FIG. 2B shows one of the keys 108 being pressed downwardly to make physical contact with the touch-sensitive surface 106. In some examples, the touch-sensitive surface 106 can be a capacitive-based touch-sensitive surface, where the physical contact between the depressed key 108 and the touch-sensitive surface 106 causes a capacitance at the location of the physical contact to change. This change in capacitance can be used to determine which key(s) 108 has been actuated.

In examples where the touch-sensitive surface 106 is a capacitive-based touch-sensitive surface, the keys 108 can be formed using a conductive material. For example, the keys 108 can include electrically conductive fibers that are coated or embedded with electrically conductive elements such as carbon or a metal.

In other examples, instead of using a capacitive-based touch-sensitive surface, a different type of touch-sensitive surface can be employed, including a resistive-based touch-sensitive surface that detects key actuation based on a change in resistance due to physical contact of a key with the touch-sensitive surface 106, an inductance-based touch-sensitive surface that can detect a change in inductance due to physical contact between a depressed key and the touch-sensitive surface 106, and so forth.

By using the mechanical keyboard 102, a user would be able to provide input using a physical keyboard, rather than a virtual keyboard. Additionally, a palm rest portion 103 can be provided on the mechanical keyboard 102 to provide a place where a user can rest the palms of the user's hands when typing. By providing the palm rest portion 103, which covers the upper surface 110 of the base part 104, inadvertent actuation of the touch-sensitive surface 106 can be avoided when the user's palms touch the palm portion 103.

In some examples, each of the base part 104 and the display part 120 can be configured as a stand-alone tablet computer. In such an example arrangement, the base part 104 can be detached from the display part 120, and the two parts can be independently used as respective tablet computers.

Figure 3:
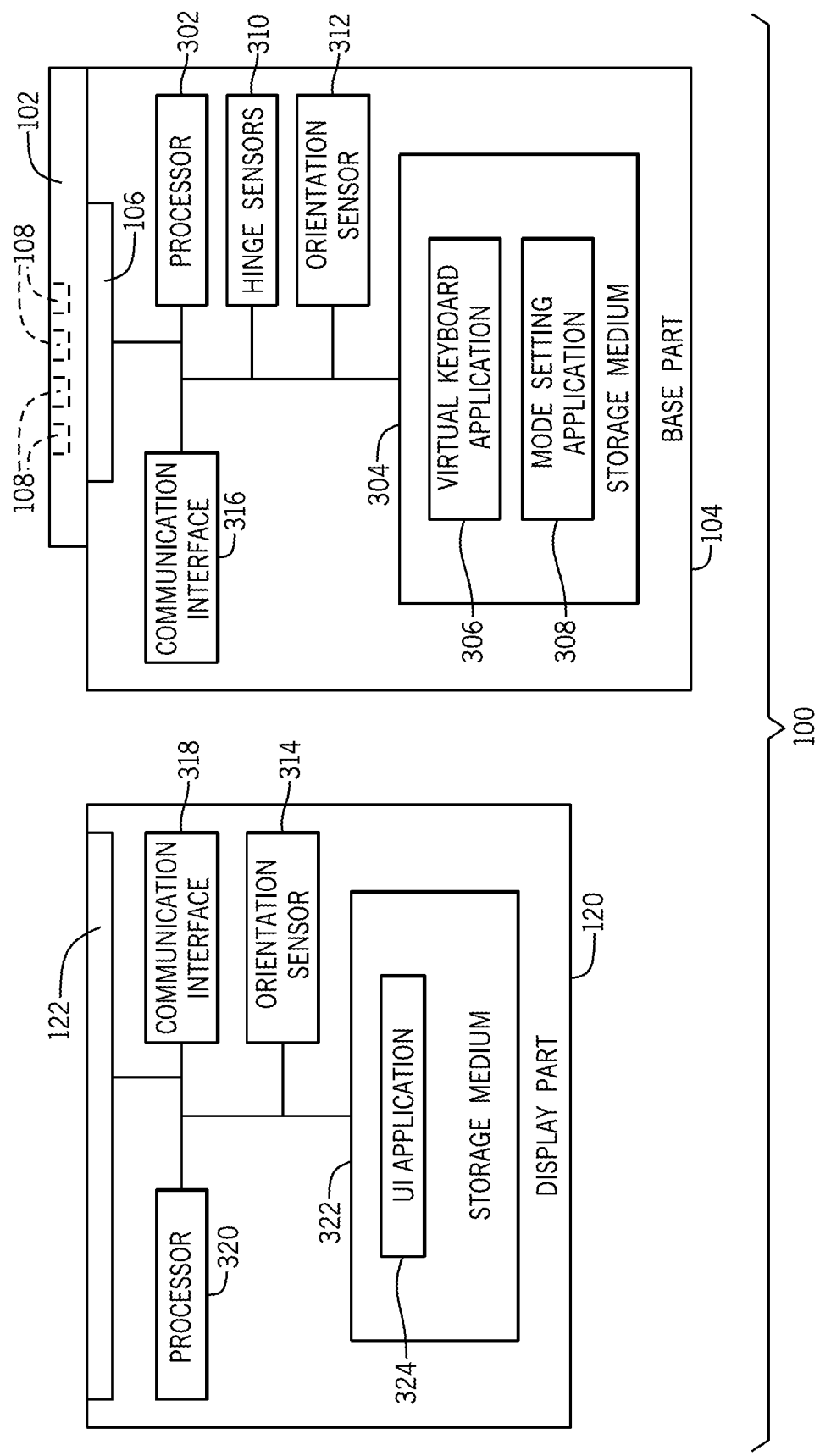
FIG. 3 is a block diagram of an electronic device according to further examples.

FIG. 3 shows example components in the base part 104 and the display part 120 according to further examples. In FIG. 3, the mechanical keyboard 102 is shown in its engaged position with respect to the base part 104. The keys 108 of the mechanical keyboard 102 are in proximity to the touch-sensitive surface 106, such that actuation of any of the keys 108 will cause a touch input made with respect to the touch-sensitive surface 106. In the example of FIG. 3, it is assumed that the touch-sensitive surface 106 is a touch-sensitive display.

The base part 104 includes a processor 302 and a non-transitory computer-readable or machine-readable storage medium 304. A processor can include a microprocessor, a core of a multi-core microprocessor, a microcontroller, a programmable integrated circuit, a programmable gate array, or another hardware processing circuit.

The storage medium 304 can store various machine-readable instructions, including a virtual keyboard application 306 and a mode setting application 308.

The virtual keyboard application 306 is an application that is configured to operate with a virtual keyboard that is displayed by the touch-sensitive display 106 (under control of the virtual keyboard application 306). The processor 302 can invoke the virtual keyboard application 306 responsive to receiving an indication that the mechanical keyboard 102 is at the engaged position. The virtual keyboard application 306 is executable to perform tasks in response to detected actuations of the keys 108 of the mechanical keyboard 102.

Instead of the virtual keyboard application 306 detecting a user's fingers touching the touch-sensitive display 106 directly, the mechanical keyboard 102 is instead used to provide the touching of the touch-sensitive display 106 when the user presses on respective keys 108 of the mechanical keyboard 102. In this manner, features of a virtual keyboard and a mechanical keyboard can be combined.

The virtual keyboard application 306 is able to detect touch inputs on the touch-sensitive display 106 provided by the keys 108 of the mechanical keyboard 102. In examples where the virtual keyboard is displayed by the touch-sensitive display 106, the virtual keys of the virtual keyboard 106 can be aligned with the keys 108 of the mechanical keyboard 102 when the mechanical keyboard 102 is in the engaged position, such that actuation of each key 108 of the mechanical keyboard 102 would make a touch input on the corresponding virtual key.

In other examples, the virtual keyboard is not actually displayed by the touch-sensitive display 106. Rather, the virtual keyboard application 306 can map different locations on the touch-sensitive display 106 (or other type of touch-sensitive surface) to respective virtual keys, such that the touching of such locations by the physical keys 108 of the mechanical keyboard 102 would be recognized by the virtual keyboard application 306 as corresponding virtual keys.

In a different example, instead of using a virtual keyboard application 106, a different application or other type of machine-readable instructions can be used for detecting touch input on the touch-sensitive display 106 (or other touch-sensitive surface) by the keys 108 of the mechanical keyboard 102.

In some examples, the keys 108 of the mechanical keyboard 102 include a light transmissive material (e.g., a transparent material or a translucent material). Light of the touch-sensitive display 106 can pass through the keys 108, such that the keys 108 can be illuminated by the light from the touch-sensitive display 106. In examples where the touch-sensitive display 106 displays a virtual keyboard and the keys 108 are transparent, a user may see the keys of the virtual keyboard through the keys 108.

The mode setting application 308 is able to set a mode of operation of the electronic device 100. As noted above, FIG. 1B shows a mechanical keyboard notebook mode, while FIG. 1A shows a touch notebook mode. The electronic device 100 can be operated in other modes based on other relative orientations of the base part 104 and the display part 120, which can cause different images to be displayed by the display devices of the base part 104 and the display part 120 (discussed further below).

The mode setting application 308 can set the mode of operation of the electronic device 100 based on orientation information provided by hinge sensors 310 and an orientation sensor 312 in the base part 104, and an orientation sensor 314 in the display part 120. The hinge sensors 310 can detect the pivoting of the hinges 116 and 124. The orientation sensor 312 can detect an orientation of the base part 104, and the orientation sensor 314 can detect the orientation of the display part 120. In some examples, the orientation sensors 312 and 314 can be implemented using accelerometers and/or gyroscopes or other types of sensors that can detect a relative orientation of the base part 104 or display part 120.

The virtual keyboard application 306 and the mode setting application 308 are executable on the processor 302. An application executable on a processor can refer to the application executable on one processor or on multiple processors.

The base part 104 further includes a communication interface 316, which can be used to communicate with a corresponding communication interface 318 in the display part 120. In some examples, the communication interfaces 316 and 318 can include wireless interfaces, such as for performing Bluetooth communications, Near Field Communications (NFC), Wi-Fi communications, and so forth. In other examples, the communication interfaces 316 and 318 can include wired interfaces to allow the base part 104 and the display part 120 to communicate over a wired link.

The display part 120 includes a processor 320 and a storage medium 322. The storage medium 322 stores machine-readable instructions, such as a user interface (UI) application 324. The UI application 324 is executable on the processor 320 to present a UI in the display device 120. In examples where the display device 122 is a touch-sensitive display device, the UI application 324 can also detect touch inputs on the touch-sensitive display device 122.

In further examples, the virtual keyboard application 306 and/or the mode setting application 308 can be provided in the display part 120 instead of in the base part 104.

In an example operation, actuation of keys 108 of the mechanical keyboard 102 can be detected by the virtual keyboard application 306, and indications of the actuated keys can be communicated through the communication interfaces 316 and 318 to the UI application 324, which can change an image displayed by the display device 122 in response to the actuated key(s).

As noted above, the mode setting application 308 can set different modes of operation of the electronic device 100. In addition to the notebook modes shown in FIGS. 1A and 1B, the mode setting application 308 can also set a tent mode (FIG. 4) and a book mode (FIG. 5).

Figure 4:
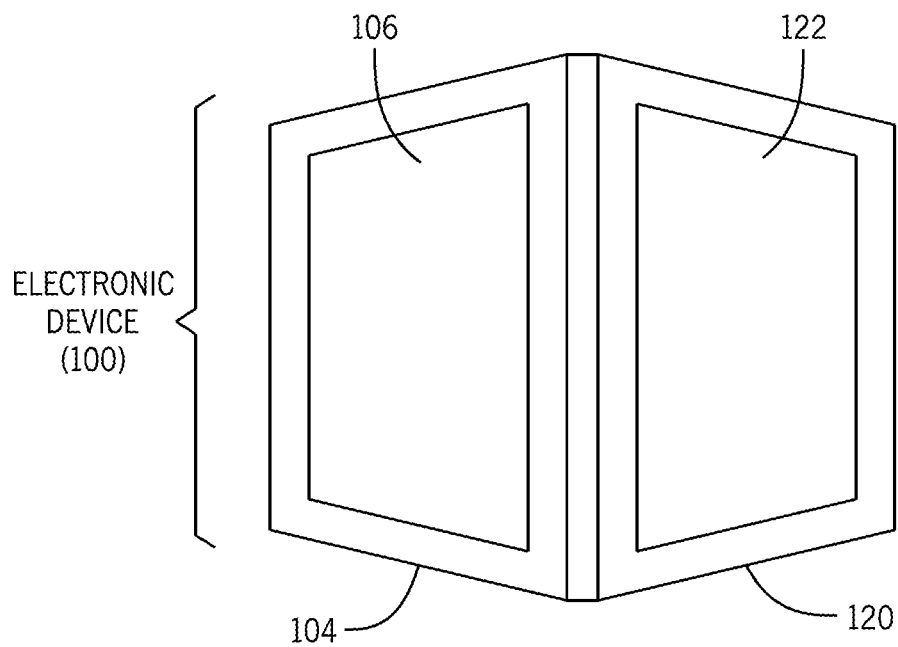
FIGS. 4 and 5 illustrate an electronic device in different modes of operation, according to further examples.

As shown in FIG. 4, in the tent mode of operation, the base part 104 is pivoted to be angled (as detected by the hinge sensors 310) with respect to the display part 120, and the electronic device 100 is placed generally in a portrait orientation (which can be detected by orientation sensors 312 and 314). In the tent mode of operation shown in FIG. 4, the display device 106 of the base part 104 can be facing a first user, while the display device 122 of the display part 120 can be facing a second user. In this mode of operation, the display devices 106 and 122 can display identical information, such that both users are seeing the same information (e.g., same program image), or alternatively, the display device 106 can present display information tailored to the first user, and the display device 122 can display information tailored to the second user.

Figure 5:
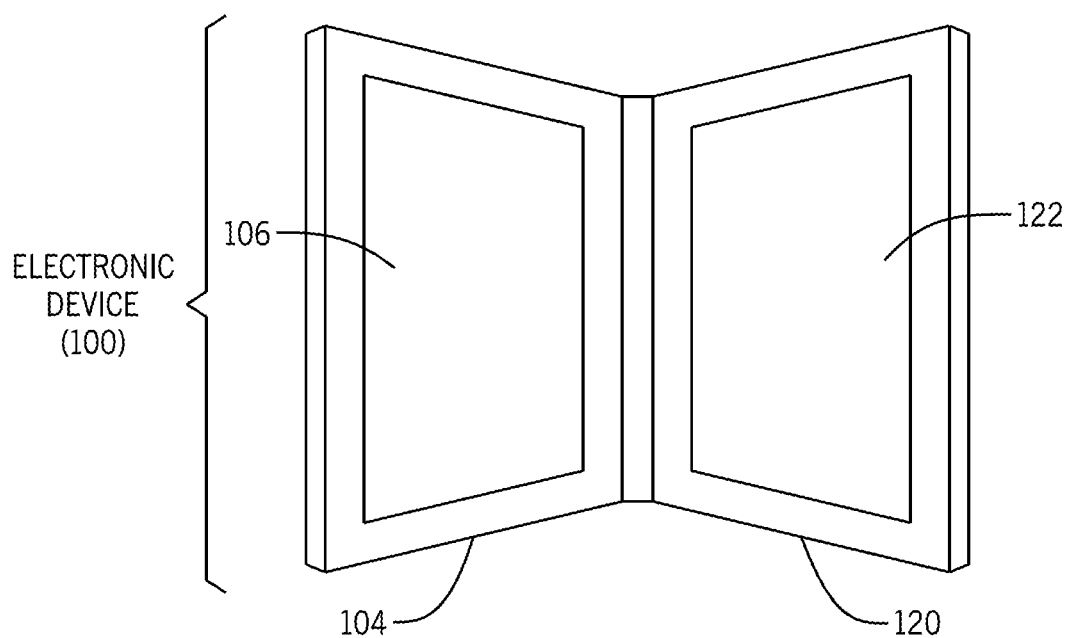

In the book mode of operation shown in FIG. 5, the base part 104 and the display part 120 are pivoted with respect to one another and held in an orientation that is similar to a way a user would hold a book when the book is in an open position and the user is reading the book. As shown in FIG. 5, the display device 106 can display first information (e.g., one page of a book), while the display device 122 can display second information (e.g., a second page of a book).

In other examples, other modes of operation of the electronic device 100 are possible and can be set by the mode setting application 308.

Figure 6:
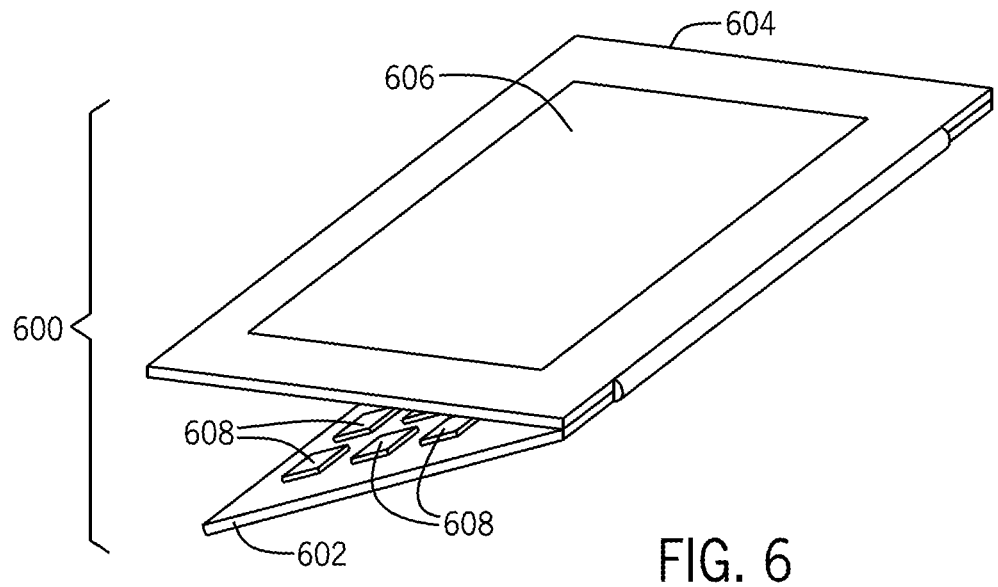
FIG. 6 illustrates a portion of an electronic device, according to some examples.

FIG. 6 shows a portion of an electronic device 600, which includes a first part 604 having a touch-sensitive surface 606. The electronic device 600 further includes a mechanical keyboard 602 pivotally attached to the first part 604. The mechanical keyboard 602 is pivotable between a first position where the keyboard 602 is away from the touch-sensitive surface 606, and a second position where the keyboard 602 is engaged to the touch-sensitive surface 606. The touch-sensitive surface is able to detect actuations of keys 608 of the mechanical keyboard 602 when the mechanical keyboard is at the second position and engaged with the touch-sensitive surface.

In further examples, the mechanical keyboard 602 can include a moveable member and a keyboard on the moveable member. The moveable member is pivotable with respect to the base part 104. In some examples, the keyboard is removably attached to the moveable member, and the keyboard is removable from the moveable member for replacement with another keyboard (such as with a keyboard of a different language or a keyboard for a different purpose, such as for gaming).

Figure 7:
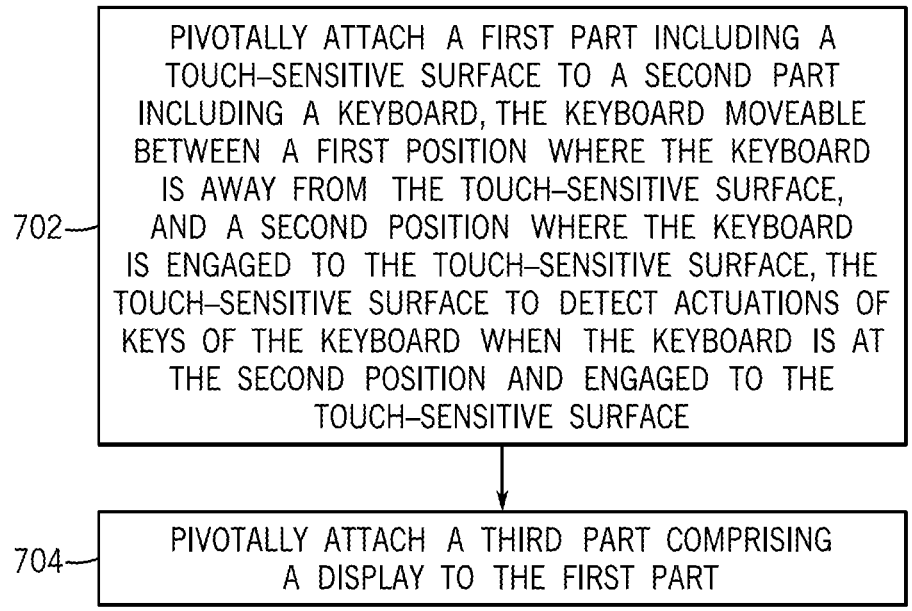
FIG. 7 is a flow diagram of a process of making an electronic device, according to some examples.

FIG. 7 is a flow diagram of a process of making an electronic device. The process includes pivotally attaching (at 702) a first part including a touch-sensitive surface to a second part including a keyboard, the keyboard moveable between a first position where the keyboard is away from the touch-sensitive surface, and a second position where the keyboard is engaged to the touch-sensitive surface. The touch-sensitive surface is to detect actuations of keys of the keyboard when the keyboard is at the second position and engaged to the touch-sensitive surface.

The process further includes pivotally attaching (at 704) a third part comprising a display to the first part.

In examples discussed above, machine-readable instructions such as the virtual keyboard application 306, the mode setting application 308, and the UI application 324 can be stored in respective storage media (e.g., 304 and 322 in FIG. 3). A storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
   a first part comprising a touch-sensitive surface;
   a second part comprising a display device;
   a first hinge connecting the second part to the first part on one side of the first part;
   a mechanical keyboard pivotally attached to the first part; and
   a second hinge connecting the first part to the mechanical keyboard on an opposite side of the first part, the mechanical keyboard pivotable at the second hinge between a first position where the mechanical keyboard is away from the touch-sensitive surface, and a second position where the mechanical keyboard is engaged to the touch-sensitive surface, wherein the mechanical keyboard is an overlay keyboard without any electrically conductive lines and sensing circuitry to detect actuations of keys of the mechanical keyboard,
   the touch-sensitive surface to detect actuations of the keys of the mechanical keyboard when the mechanical keyboard is at the second position and engaged with the touch-sensitive surface, wherein the mechanical keyboard is pivotable at the second hinge to the first position where the mechanical keyboard is under the first part so that the touch-sensitive surface is accessible for user input and the touch-sensitive surface and the display device both face a user.

2. The electronic device of claim 1, wherein the touch-sensitive surface is to detect a touch input made on the touch-sensitive surface by a physical contact between an actuated key of the mechanical keyboard and the touch-sensitive surface.

3. The electronic device of claim 1, wherein the touch-sensitive surface is part of a touch-sensitive display that is included in the first part.

4. The electronic device of claim 3, wherein the display device is separate from the touch-sensitive display.

5. The electronic device of claim 1, further comprising:
   sensors to detect different positions of the first part, the second part, and the mechanical keyboard; and
   a processor to operate the electronic device in respective different modes responsive to the detected different positions.

6. The electronic device of claim 5,
   wherein the sensors are to detect positions of the first and second hinges.

7. The electronic device of claim 1, wherein the first part is to wirelessly communicate with the second part.

8. The electronic device of claim 4, wherein the first part comprises a first tablet computer, and the second part comprises a second tablet computer.

9. The electronic device of claim 1, wherein the keys of the mechanical keyboard are actuatable to touch respective different touch locations of the touch-sensitive surface, the electronic device further comprising:
   a controller to map the different touch locations to respective keys of the mechanical keyboard.

10. The electronic device of claim 1, further comprising:
    a processor to invoke a virtual keyboard application responsive to receiving an indication that the mechanical keyboard is at the second position,
    the virtual keyboard application executable to perform tasks in response to detected actuations of the keys.

11. The electronic device of claim 1, wherein the mechanical keyboard has a palm rest portion providing a place for a user's palm.

12. An apparatus comprising:
a first display member comprising a display device;
a second display member comprising a touch-sensitive display;
a first hinge connecting the second display member to the first display member on a first side of the second display member;
a moveable member comprising a keyboard; and
a second hinge connecting the second display member to the moveable member on a second side of the second display member, the second side opposite the first side, wherein the moveable member is pivotally attached to the second display member at the second hinge and is moveable relative to the second display member between a first portion and a second portion,
a key of the keyboard when actuated to impart a touch input on the touch-sensitive display when the moveable member is at the second position, wherein the keyboard is an overlay keyboard without any electrically conductive lines and sensing circuitry to detect actuations of keys of the keyboard, wherein the moveable member is pivotable at the second hinge to the first position where the keyboard is under the second display member so that the touch-sensitive display is accessible for user input and the touch-sensitive display and the display device both face a user.

13. The apparatus of claim 12, wherein the keys comprise a light transmissive material, and light of the touch-sensitive display is to pass through the keys.

14. The apparatus of claim 12, wherein the keyboard is removably attached to the moveable member, and the keyboard is removable from the moveable member for replacement with another keyboard.

15. The apparatus of claim 12, wherein the keys of the keyboard are actuatable to touch respective different touch locations of the touch-sensitive display, the apparatus further comprising:
a controller to map the different touch locations to respective keys of the keyboard.

16. The apparatus of claim 15, wherein a virtual keyboard is not displayed in the touch-sensitive display while the touch-sensitive display detects touches of the keys of the keyboard when actuated.

17. A method of making an electronic device, comprising:
pivotally attaching, by a first hinge, a first part comprising a display device to a base part comprising a touch-sensitive surface, wherein the first hinge is on a first side of the base part; and
pivotally attaching, by a second hinge, the base part comprising the touch-sensitive surface to a second part comprising a keyboard, wherein the second hinge is on a second side of the base part, the second side opposite the first side, wherein the keyboard is moveable at the second hinge between a first position where the keyboard is away from the touch-sensitive surface, and a second position where the keyboard is engaged to the touch-sensitive surface, the touch-sensitive surface to detect actuations of keys of the keyboard when the keyboard is at the second position and engaged to the touch- sensitive surface, wherein the keyboard is an overlay keyboard without any electrically conductive lines to detect actuations of the keys of the keyboard, and
wherein the keyboard is pivotable at the second hinge to the first position where the keyboard is under the base part so that the touch-sensitive surface is accessible for user input and the touch-sensitive surface and the display device both face a user.

18. The method of claim 17, wherein the first side and the second side of the base part are spaced apart by a gap that includes a width of the touch-sensitive surface on the base part.

19. The method of claim 17, wherein the keys of the keyboard are actuatable to touch respective different touch locations of the touch-sensitive surface, the method further comprising:
providing a controller in the electronic device to map the different touch locations to respective keys of the keyboard.

* * * * *